(12) United States Patent
Nageli et al.

(10) Patent No.: US 8,163,127 B2
(45) Date of Patent: Apr. 24, 2012

(54) PROCESS FOR MANUFACTURING A PACKAGING MATERIAL

(75) Inventors: Hans Rudolf Nageli, Neuhausen (CH); David Bruce, Alionby (GB); Franz Peter Hombach, Beringen (CH)

(73) Assignee: Alcan Technology & Management Ltd., Neuhasen am Rheinfall (CH)

( * ) Notice: Subject to any disclaimer, the term of this patent is extended or adjusted under 35 U.S.C. 154(b) by 1002 days.

(21) Appl. No.: 11/170,399

(22) Filed: Jun. 30, 2005

(65) Prior Publication Data

US 2006/0003123 A1 Jan. 5, 2006

(30) Foreign Application Priority Data

Jul. 1, 2004 (EP) .................................... 04405407

(51) Int. Cl.
*C09J 5/10* (2006.01)
(52) U.S. Cl. ................. 156/306.9; 156/307.1; 250/492.3
(58) Field of Classification Search .................. 156/277, 156/306.9, 307.1, 307.7, 331.3; 250/492.3
See application file for complete search history.

(56) References Cited

U.S. PATENT DOCUMENTS

| | | | |
|---|---|---|---|
| 4,566,927 A | 1/1986 | Wood | |
| 4,849,040 A | 7/1989 | Wood | |
| 4,906,494 A * | 3/1990 | Babinec et al. | 428/35.2 |
| 4,997,504 A | 3/1991 | Wood | |
| 5,165,799 A | 11/1992 | Wood | |
| 6,103,316 A | 8/2000 | Tran et al. | |
| 2001/0033988 A1 | 10/2001 | Husemann et al. | |
| 2002/0146525 A1* | 10/2002 | Huffer et al. | 428/35.3 |
| 2002/0155243 A1 | 10/2002 | Kobe et al. | |
| 2003/0180531 A1 | 9/2003 | Husemann et al. | |
| 2004/0065408 A1 | 4/2004 | Rosenberger et al. | |
| 2004/0067305 A1 | 4/2004 | Nageli et al. | |
| 2004/0209002 A1 | 10/2004 | Kobe et al. | |
| 2004/0240683 A1 | 12/2004 | Niederdrank | |

FOREIGN PATENT DOCUMENTS

| | | |
|---|---|---|
| DE | 10163490 | 1/2004 |
| EP | WO 01/94451 | 12/2001 |
| EP | 1347026 | 9/2003 |
| EP | 1407880 | 4/2004 |
| WO | WO 02/062913 | 8/2002 |

* cited by examiner

*Primary Examiner* — Michael C Miggins
(74) *Attorney, Agent, or Firm* — Fisher, Christen & Sabol

(57) ABSTRACT

A process for manufacturing a packaging material with at least two films (12,16) or foils bonded together via at least one adhesive layer (13) to form a multi-layer laminate (10) is such that at least one adhesive layer is an electron-beam-curable adhesive and the laminate (10) is radiated with electrons in order to cure the adhesive. The laminate is particularly suitable for manufacturing pouch-type forms of packaging, in particular for snack foods. The production of laminate using electron-beam-curable adhesive results in a significant reduction in throughput time and in a reduction of solvent emissions by replacing solvent-based adhesives with electron-beam-curable adhesives.

17 Claims, 1 Drawing Sheet

PROCESS FOR MANUFACTURING A PACKAGING MATERIAL

Figure 1:
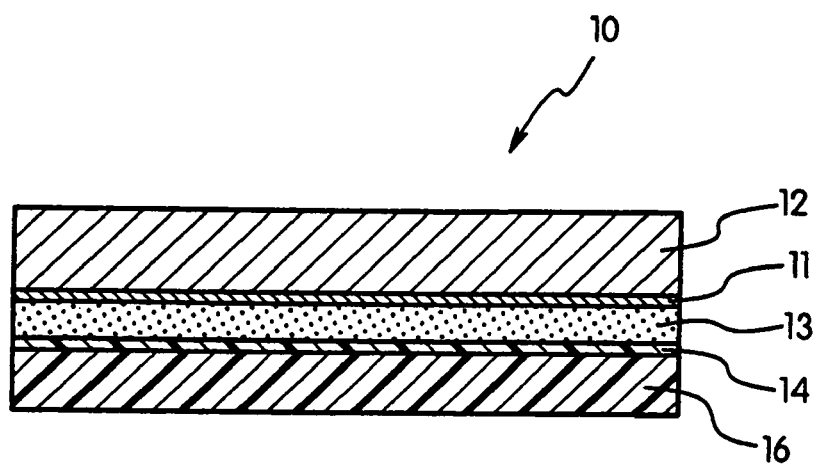

This application has benefit of the priority of European Patent Application No. 04405407.0, filed on Jul. 1, 2004.

The invention relates to a process for manufacturing a packaging material having at least two films or foils that are bonded together by means of at least one adhesive to make up a multi-layer laminate, whereby the adhesive layer/layers is/are cured. Also within the scope of the invention is a pouch-type form of packaging made from the laminate.

Laminates for manufacturing pouch-type forms of packaging for snacks such as, e.g., crisps or crackers are made today by laminating a printed oriented poly-propylene (oPP)-film to a metallized oPP-film. Thereby, the metallized oPP-film is printed on using a counter-printing process and laminated to an oPP-film which is coated with a solvent-free or solvent-based polyurethane (PUR)-adhesive.

The solvent-free process of manufacture is environmental-friendly, however, requires a longer curing time. The metallized oPP-film is adhesively bonded to a printed oPP-film coated with a solvent-free polyurethane-adhesive. The final structure is oPP-film/adhesive/oPP-film. After the subsequent curing over an interval of several days, the laminate can be cut to size and dispatched to the customers. The time required from receipt of the order to the delivery of the final product, i.e., the throughput time, depends essentially on the time required for curing the PUR-adhesive.

The object of the present invention is to provide a process of the kind mentioned at the start, by means of which The time for curing the adhesive necessary for lamination—and thereby the throughput time—can be reduced in comparison with conventional laminate manufacture.

That objective is achieved by way of the invention in that the—at least one—adhesive layer is of an adhesive that can be cured by an electron beam and the laminated is radiated with an electron beam in order to cure the adhesive.

The radiation curing using an electron beam takes place within a fraction of a second as the laminate is passed through a radiation station, whereby essentially, the final bond strength is achieved—without any additional curing time—when the laminate emerges from the radiation station and is coiled.

The advantage of laminate manufacture using electron-beam-curable adhesive lies not only in a substantially reduced throughput time, but also in a reduction of solvent emissions when solvent-based adhesives can be replaced by electron-beam-curable adhesives.

A preferred laminate exhibits two films or foils and an adhesive layer which is made of art electron-beam-curable adhesive.

The adhesive layers of an electron-beam-curable adhesive are preferably cured at a voltage of 50 to 125 kV, in particular 70 to 100 kV, using an electron beam directed at the surface of the laminate delivering a radiation dose amounting to 10 to 50 kGy, preferably 20 to 40 kGy.

A preferred laminate has the following structure: oPP-film/printing/adhesive layer of an electron-beam-curable adhesive/oPP-film.

A further preferred laminate exhibits the following structure: oPP-film/printing/adhesive layer of an electron-beam-curable adhesive/barrier layer/oPP-film.

The barrier layer serving as a barrier to gases, vapors and moisture is e.g., a layer of ceramic materials such as silicon oxide, aluminum oxide or aluminum nitride deposited on the substrate film as a thin layer, e.g., in the region of 10 to 500 nm thick, in vacuum. Examples of other barrier layers are metallic layers, e.g., of aluminum.

In the present case metallizing is in particular a suitable means for providing the plastic film and therefore the packaging film with barrier properties which hinder the penetration of fluids, gases, vapors, water vapor, aromas or substances that smell. A preferred form of metallizing is that of aluminum deposited on the oPP-film e.g. by sputtering or deposition in vacuum to a thickness about 10 nm to about 2 µm.

Preferred as electron-beam-curing adhesive is an acrylic-based adhesive.

The acrylic-based adhesive may contain monomers, oligomers or mixtures of monomers and oligomers as the basis. Examples of monomers are mono-, di- and multifunctional acrylates such as phosphoric-acid-ester-acrylates, hydroxy-acrylates, carboxy-acrylates, amino-acrylates, acrylic acid, and acrylic amide. Examples of oligomers are epoxy acrylates, urethane acrylates, polyester acrylates, silicon-acrylates and silane-acrylates. The monomers and oligomers mentioned are commercially available or can be manufactured using routine methods. The term "acrylate" (or "acryl") used here also includes "methacrylate" (or "methylacryl"), whereby the acrylates are preferred.

The laminate manufactured according to the process of the invention is particularly suitable for manufacturing pouch-type forms of packaging, in particular pouch-type forms of packaging for snack-type foodstuffs.

Figure 2:
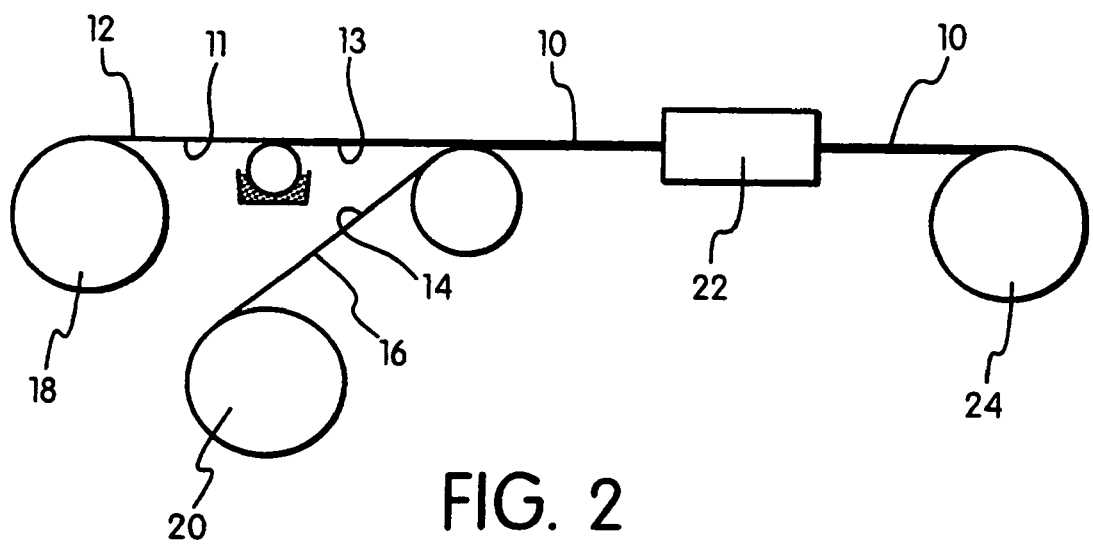

Further advantages, features and details of the invention are revealed in the following description of preferred exemplified embodiments and with the aid of the drawings which show schematically in:

FIG. 1 cross-section through a laminated packaging film;

FIG. 2 manufacture of the packaging film in FIG. 1.

Shown in FIG. 1 is a packaging film 10 for manufacturing pouch-type forms of packaging for snack-type foodstuffs such as, e.g., crisps or crackers, said packaging film 10 exhibiting as the outer side an oPP-film 12 featuring printing 11 produced using a counter-printing method, and as inner side a sealable oPP-film 16 with a barrier layer 14 in the form of a vapor-deposited aluminum layer. The Op-film 12 on the outside is attached in a permanent manner to the inner oPP-film on the inside via an adhesive layer 13 made of an electron-beam-curable adhesive. The printing 11 and the barrier layer 14 are situated between the two oPP-films 12, 16 in the interior of the packaging film 10, i.e., the adhesive layer 13 is in direct contact with the printing 11 and the barrier layer 14. In a typical packaging film 10 the thickness of the oPP-film for example about 12-20 µm.

FIG. 2 shows the production of a packaging film 10 comprising an oPP-film 12 printed on using counter printing, with barrier layer 14, adhesive layer 13 and oPP-film 16 with barrier layer 14. The printed oPP-film 12 is uncoiled from a first spool 18 and coated in a continuous manner with adhesive 13. An oPP-film 16 bearing an evaporated aluminum barrier layer 14 is uncoiled from a second spool 20 and brought into contact with the printed, adhesive-coated oPP-film 12 and laminated to it forming a packaging film 10 in a continuous manner. The packaging film 10 is passed through a radiation station 22 in which the adhesive layer 13 is cured by electron beam radiation in a fraction of a second. Thereby, the process parameters, i.e., the high voltage and the amount of radiation are set such that sufficient radiation is applied to the adhesive layer 13 to cure it, but only a small amount of radiation that negatively affects the sealing the oPP-film 16.

On emerging from the radiation station 22 the packaging film 10 is coiled onto a third spool 24.

The packaging film 10 with the completely cured adhesive layer 13 can be divided immediately on the spool 24 into conventional, commercial widths using a cutting device.

It is self-evident that in the bonding of the films or foils in the described lamination process the adhesive can also be deposited on the other film or foil than those selected in the examples.

The invention claimed is:

1. A process for manufacturing a packaging material with two films (12, 16) or foils bonded via an adhesive layer to form a multi-layer laminate (10) whereby the adhesive layer (13) is cured, radiating with electrons the adhesive layer (13) of an electron-beam-curable adhesive and the laminate (10) to cure the adhesive, the adhesive layer (13) of the electron-beam-curable adhesive is cured at a high voltage of 70 to 100 kV by means of an electron-beam directed at the surface of the laminate (10) delivering a radiation dose amounting to 10 to 50 kGy, the laminate (10) has the following structure: oPP-film (12)/printing (11)/adhesive (13) of an electron-beam-curable adhesive/oPP-film (16).

2. The process according to claim 1, wherein the radiation dose is 20 to 40 kGy.

3. A process for manufacturing a packaging material with two films (12, 16) or foils bonded via an adhesive layer to form a multi-layer laminate (10) whereby the adhesive layer (13) is cured, radiating with electrons the adhesive layer (13) of the electron-beam-curable adhesive and the laminate (10) is radiated with electrons to cure the adhesive, the adhesive layer (13) of an electron-beam-curable adhesive is cured at a high voltage of 70 to 100 kV by means of an electron-beam directed at the surface of the laminate (10) delivering a radiation dose amounting to 10 to 50 kGy, the laminate (10) has the following structure: oPP-film (12)/printing (11)/adhesive layer (13) of an electron-beam-curable adhesive/barrier layer (14)/oPP-film (16).

4. The process according to claim 3, wherein the radiation dose is 20 to 40 kGy.

5. The process according to claim 3 wherein the barrier layer (14) is a vapor-deposited layer of metal.

6. The process according to claim 5, wherein the adhesive layer (13) of electron-beam-curable adhesive is an acrylate-based adhesive.

7. The process according to claim 5, wherein the vapor-deposited layer of metal is a vapor-deposited aluminum layer.

8. A process for manufacturing a packaging material with two films (12, 16) or foils bonded via an adhesive layer to form a multi-layer laminate (10) whereby the adhesive layer (13) is cured, radiating with electrons the adhesive layer (13) of an electron-beam-curable adhesive and the laminate (10) to cure the adhesive, the laminate (10) has the following structure: oPP-film (12)/printing (11)/adhesive (13) of an electron-beam-curable adhesive/oPP-film (16).

9. A process for manufacturing a packaging material with films (12, 16) or foils bonded via an adhesive layer to form a multi-layer laminate (10) whereby an adhesive layer (13) is cured, radiating with electrons the adhesive layer (13) of an electron-beam-curable adhesive and the laminate (10), the laminate (10) has the following structure: oPP-film (12)/printing (11)/adhesive layer (13) of an electron-beam-curable adhesive/barrier layer (14)/oPP-film (16).

10. The process according to claim 9, wherein the barrier layer (14) is a vapor-deposited layer of metal.

11. The process according to claim 10, wherein the vapor deposited layer of metal is a vapor-deposited aluminum layer.

12. A process comprising manufacturing a packaging material having two films (12, 16) or foils bonded together by means of an adhesive layer (13) of an electron-beam-curable adhesive to form a multi-layer laminate (10), radiating the laminate (10) with electrons to cure the adhesive, the adhesive layer (13) is cured at a high voltage of 70 to 100 kV by means of an electron-beam directed at the surface of the laminate (10) delivering a radiation dose amounting to 10 to 50 kGy, the laminate has a first oPP-film (12) with printing (11) produced using a counter printing method, the first oPP-film (12) is bonded via the adhesive layer (13) of an electron-beam-curable adhesive to the sealable second oPP-film (16).

13. The process according to claim 12, wherein the adhesive layer (13) of electron-beam-curable adhesive is an acrylate-based adhesive.

14. The process according to claim 2, wherein the radiation dose is 20 to 40 kGy.

15. The process according to claim 12, wherein the sealable second oPP-film is coated with a barrier layer (14).

16. The process according to claim 15, wherein the barrier layer (14) is a vapor-deposited layer of metal.

17. The process according to claim 15, wherein the barrier layer (14) is a vapor-deposited aluminum layer.

* * * * *